United States Patent
Gaudreau et al.

(10) Patent No.: US 9,780,688 B2
(45) Date of Patent: Oct. 3, 2017

(54) SYSTEM FOR REGULATING THE OUTPUT OF A HIGH-VOLTAGE, HIGH-POWER, DC SUPPLY

(71) Applicant: Diversified Technologies, Inc., Bedford, MA (US)

(72) Inventors: Marcel Pierre Joseph Gaudreau, Lexington, MA (US); Ian Saul Roth, Westford, MA (US); Michael Alan Kempkes, Westford, MA (US); Neal R Butler, Acton, MA (US)

(73) Assignee: Diversified Technologies, Inc., Bedford, MA (US)

( * ) Notice: Subject to any disclaimer, the term of this patent is extended or adjusted under 35 U.S.C. 154(b) by 711 days.

(21) Appl. No.: 13/744,729

(22) Filed: Jan. 18, 2013

(65) Prior Publication Data
US 2014/0204641 A1 Jul. 24, 2014

(51) Int. Cl.
*H02M 7/217* (2006.01)
*H02M 3/156* (2006.01)

(52) U.S. Cl.
CPC ........... *H02M 7/217* (2013.01); *H02M 3/156* (2013.01)

(58) Field of Classification Search
CPC .......... H02M 1/14; H02M 1/143; H02M 1/15; H02M 1/16; H02M 1/4233; H02M 1/4208; H02M 7/217; H02M 3/156; H02M 2003/1566; G05F 1/46
USPC .......... 363/44, 45, 48, 81, 84, 125, 126, 127
See application file for complete search history.

(56) References Cited

U.S. PATENT DOCUMENTS

| | | | |
|---|---|---|---|
| 4,000,471 A | 12/1976 | Pankow | |
| 4,992,719 A | 2/1991 | Harvey | |
| 5,070,538 A | 12/1991 | Milberger et al. | |
| 5,371,444 A * | 12/1994 | Griffin | H05B 41/282 315/195 |
| 6,388,897 B1 * | 5/2002 | Ying | H02M 3/33576 363/127 |
| 6,873,203 B1 * | 3/2005 | Latham, II | H02M 3/073 327/538 |
| 7,940,118 B1 * | 5/2011 | Forghani-zadeh | G05F 1/56 327/536 |

(Continued)

FOREIGN PATENT DOCUMENTS

| | | |
|---|---|---|
| EP | 1406373 A2 | 4/2004 |
| EP | 1571752 A2 | 9/2005 |

(Continued)

OTHER PUBLICATIONS

Written Opinion of the International Searching Authority for International Application No. PCT/US2013/059145, dated Feb. 19, 2014, 9 pgs.

(Continued)

*Primary Examiner* — Adolf Berhane
(74) *Attorney, Agent, or Firm* — Iandiorio Teska & Coleman, LLP

(57) ABSTRACT

A system for regulating the output of a high-voltage, high-power DC supply, the system includes a high-voltage DC power supply, a storage capacitor, and at least one non-dissipative regulator having an output voltage range less than an output voltage range of the high-voltage DC power supply. The regulator includes an internal storage capacitance and a control circuit configured to maintain a desired high-voltage output on a load.

34 Claims, 14 Drawing Sheets

(56) References Cited

U.S. PATENT DOCUMENTS

| | | |
|---|---|---|
| 2007/0146092 A1 | 6/2007 | Cassel |
| 2007/0296278 A1 | 12/2007 | Sekiya et al. |
| 2010/0103703 A1* | 4/2010 | Nishiyama .......... H02M 3/3376 363/17 |
| 2011/0080156 A1 | 4/2011 | Briere et al. |
| 2012/0001602 A1 | 1/2012 | Egan et al. |

FOREIGN PATENT DOCUMENTS

| | | |
|---|---|---|
| EP | 0947048 B2 | 5/2012 |
| WO | WO 2012/001409 A1 | 1/2012 |
| WO | 2013004019 A1 | 1/2013 |

OTHER PUBLICATIONS

Aguglia et al., Klystron Modulator Technology Challenges for the Compact Linear Collider (CLIC), Pulsed Power conference, Jun. 19-23, 2011, IEEE, pp. 1413-1421.

\* cited by examiner

SYSTEM FOR REGULATING THE OUTPUT OF A HIGH-VOLTAGE, HIGH-POWER, DC SUPPLY

FIELD OF THE INVENTION

This invention relates to a system for regulating the output of a high-voltage, high-power, DC power supply.

BACKGROUND OF THE INVENTION

Conventional modulators used in pulsed accelerators produce electrical pulses that drive radio frequency (RF) tubes. The RF output from these tubes produces an electric field in acceleration cavities and the electric field accelerates the charged particles. The acceleration cavities can either be normally-conducting or superconducting. The pulses in normally-conducting cavities are typically only a few microseconds long to minimize the resistive dissipation in the cavities. Since there is very little dissipation in superconducting cavities, the pulses for these are much longer, typically of order a few milliseconds, because this reduces the peak power required.

One example of a current long-pulse modulator is at the Spallation Neutron Source (SNS) at Oak Ridge National Laboratory. The specification for this modulator is shown in Table 1 below:

TABLE 1

SNS modulator specification.

| | |
|---|---|
| Voltage | 85 kV |
| Current | 165 A |
| Pulse Width | 1.5 ms |
| Repetition Rate | 60 Hz |
| Voltage Flatness | 1% |

Ideally, such a pulse modulator would provide very flat pulses (constant voltage), at high efficiency and low cost, in a compact and reliable configuration. These factors present a number of challenges. One challenge associated with long, e.g., millisecond scale, pulses at high current is that they couple substantial charge, which decreases the voltage on the capacitors in the modulator. This voltage decrease is often referred to as droop. It is typically desirable to limit the capacitor droop to a few percent or less. While it is conceptually possible to increase the capacitance to limit this droop, the size of a capacitor needed to achieve this is typically too large to be practical. For example, limiting the capacitor droop to 1% in the SNS modulator discussed above would require a capacitor bank that stores about 1.1 MJ. Instead, an alternate means of reducing capacitor droop regulation is needed.

Another problem associated with pulsed modulators is that they do not draw constant power. Pulse modulators typically draw power in a pulsed fashion, which transiently decreases the voltage on the AC lines, a phenomenon known as flicker (named because it makes electric lights flicker). Flicker can be highly disruptive to both local power users and the grid itself.

There are several conventional modulator designs which have been deployed in large accelerator systems. Each of these has one or more drawbacks in its implementation, as discussed below. One of the significant challenges to these designs is the need to regulate voltage droop in a long-pulse modulator.

Historically, droop regulation has been done by dissipating power with a vacuum tube. However, the power dissipated in a vacuum tube would be substantial. For example, a system with 10% droop would require at least 5% average dissipation, which would be 63 kW in each of the fifteen SNS modulators.

In high-power modulators, it is desirable to regulate droop without such dissipation. There are several techniques currently used to regulate droop without dissipation. One is a power converter modulator, such as the one currently implemented at the SNS. This power converter design includes a semiconductor switch bridge circuit that produces pulses of alternate voltage. The pulses are stepped up by a transformer, then rectified to deliver the output pulse. To provide a flat output pulse as the voltage on the bus capacitor droops, the width of the alternating pulses is increased over time, similar to pulse-width modulation in a switching power supply.

One problem with this implementation is the bridge circuit switches full power repeatedly during a pulse. Such a design requires large switching transistors. To reduce the switching losses in the transistors, the bridge circuit may be resonant. However, this adds significant complexity to the device. Developing the modulator system for the SNS has taken ten years and has had multiple failures in the switching transistors, the resonant capacitors across the IGBTs, and the high-voltage transformers. Moreover, the droop regulation is not yet functional.

Another conventional system used to regulate droop in a long-pulse modulator is a bouncer modulator. The bouncer modulator compensates for the droop with an auxiliary capacitor and inductor. Both the main power supply and the bouncer power supply for the bouncer modulator need to be well-regulated to provide an accurate output voltage, and therefore need to be switching power supplies. A high-power main switching supply is significantly more expensive than an SCR-controlled supply, which cannot be used in this architecture.

Another conventional design is a pulse-step modulator, which operates with multiple stages that are charged in parallel by a transformer then switched in series. The power flows through a boost regulator, which is controlled to provide a constant power draw which reduces flicker. One problem with the conventional pulse-step modulator is that the boost regulators need to be large enough to carry all the power. This is much more expensive than an SCR-controlled power supply. The pulse step modulator is also large because of the high-voltage charging transformer.

Yet another conventional system used to regulate droop in a long-pulse modulator is a Marx generator. The Marx generator is similar to the pulse-step modulator because multiple stages are charged in parallel, then switched in series. The main difference is the Marx generator charge current passes up the chain of stages, while the pulse-step modulator charges through a transformer with multiple secondary windings. Additional Marx stages can be switched on during the pulse to compensate for droop, which add to the overall cost and complexity of the modulator. Such a design also requires an expensive switching power supply to eliminate flicker.

Accelerators can also be designed to operate continuously rather than being pulsed. While voltage regulation is important for these systems as well, the major concern is ripple on the output pulse rather than droop. An example of a continuous accelerator is the Advanced Photon Source (APS) at Argonne National Laboratory. The APS modulator parameters are shown in Table 2 below. The large amount of ripple is because the high-voltage power supply is SCR-controlled. While a switching supply would produce much less ripple, it would be more expensive.

TABLE 2

APS modulator parameters.

| Voltage | 100 kV |
|---|---|
| Current | 20 A |
| Present Ripple | 1.3 kV p-p |

There are several conventional approaches to mitigate the ripple from the power supply. In one example, a modulating-anode supply reduces the ripple voltage between the cathode and the modulating anode, and low-level RF feedback compensates for the remaining ripple. Although this method is somewhat effective, it may be necessary in some instances to reduce the ripple even further.

Thus, there is a need for a system which regulates the output of a high-voltage, high-power, DC supply to reduce capacitor droop and DC ripple.

BRIEF SUMMARY OF THE INVENTION

The subject invention, however, in other embodiments, need not achieve all these objectives and the claims hereof should not be limited to structures or methods capable of achieving these objectives.

In one aspect, a system for regulating the output of a high-voltage, high-power DC supply is featured. The system includes a high-voltage DC power supply, a storage capacitor, and at least one non-dissipative regulator having an output voltage range less than an output voltage range of the high-voltage DC power supply. The regulator includes an internal storage and a control circuit configured to maintain a desired high-voltage output on a load.

In one embodiment, the storage capacitor and at least one non-dissipative regulator may be connected in series. The high-voltage DC power supply may be connected in parallel with the series combination of the storage capacitor and the at least one non-dissipative regulator. The high-voltage DC power supply connected in parallel with the series combination of the storage capacitor and the at least one non-dissipative regulator may include a modulator comprising at least one switching device. The high-voltage power supply and the storage capacitor may be connected in parallel. The at least one non-dissipative regulator may be connected in series with the parallel combination of storage capacitor and high voltage power supply. The at least one non-dissipative regulator connected in series with the parallel combination of storage capacitor and high voltage power supply may include a modulator comprising at least one switching device. The at least one non-dissipative regulator may be connected in series with the high-voltage power supply. The series combination of the power supply and at least one non-dissipative regulator may be connected in parallel with the capacitor. The series combination of the power supply and at least one non-dissipative regulator connected in parallel with the capacitor may include a modulator comprising at least one switching device. The system may include a modulator including at least one switching device. The regulator may be configured to cancel variations in the high-voltage output to provide a flat high-voltage. The control circuit may be configured to maintain the desired high-voltage on the load by measuring load voltage and adjusting the regulator voltage such that the sum of the regulator voltage and the storage capacitor voltage equals the desired high-voltage. The at least one regulator may include a plurality of regulators connected in series with the storage capacitor to provide a greater voltage adjustment range. The system may include a modulator comprising a switching device. The at least one regulator may include a plurality of regulators connected in parallel with respect to each other and the parallel combination is connected in series with the storage capacitor to provide greater current capacity. The system may include a modulator comprising a switching device. The regulator may include at least one stage. The regulator may include a bridge circuit comprised of one or more of switching transistors. The bridge circuit may include a full bridge circuit. The bridge circuit may include a half bridge circuit. The bridge circuit may include a four-switch half bridge circuit. The high-voltage DC power supply, the storage capacitor, and the regulator may be integrated with a multi-stage pulse step modulator. The high-voltage DC power supply, the storage capacitor, and the regulator may be integrated with a Marx generator. The system may include an output pulsed transformer. The output voltage range of the at least one regulator may be less than about 20% of the output voltage range of the high-voltage DC power supply. The high-voltage DC power supply may be configured to be SCR-controlled. The high-voltage DC power supply may include a switching supply. The high-voltage DC power supply may include a transformer-rectifier. The regulator may be configured to reduce DC ripple by generating a cancellation voltage that approximately matches any DC ripple created by the high-voltage DC power supply. The regulator may be pulse-frequency modulated. The regulator may be pulse-width modulated. The regulator may be boundary-controlled. The system may include one or more LC filters configured to remove transient voltages.

In another aspect, a system for regulating the output of a high-voltage, high-power DC supply is featured. The system includes a modulator, a high-voltage DC power supply, a storage capacitor, and at least one non-dissipative regulator having an output voltage range less than an output voltage range of the high-voltage DC power supply, the regulator includes an internal storage and a control circuit configured to maintain a desired high-voltage output on a load.

In yet another aspect, a system for regulating the output of a high-voltage, high-power DC supply is featured. The system includes a high-voltage DC power supply, a storage capacitor, and at least one non-dissipative regulator having an output voltage range less than an output voltage range of the high-voltage DC power supply. The regulator includes an internal storage and a control circuit configured to maintain a high-voltage output at a desired high-voltage on a load to reduce DC ripple.

In one embodiment, the regulator may be configured to reduce DC ripple by generating a cancellation voltage which approximately matches any ripple on the high-voltage DC power supply.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
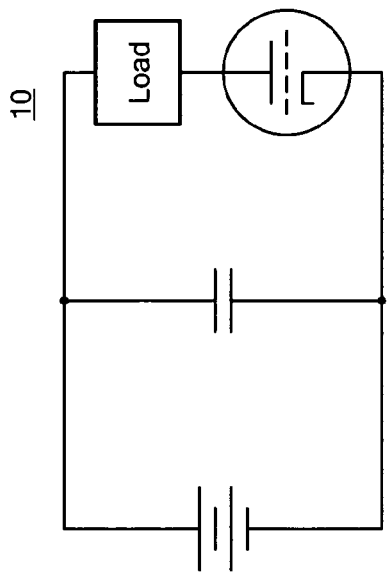
FIG. 1 is a schematic block diagram of a conventional dissipative system to regulate droop in a pulsed modulator using a vacuum tube.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, there are several conventional systems used to regulate droop in long-pulsed modulators. Historically, this has been done by dissipating power with a vacuum tube 10 as shown in FIG. 1. However, the power dissipated in the vacuum tube is substantial. A system with a 10% droop would require at least 5% average dissipation, which would be 63 kW for each of the 15 SNS modulators.

Figure 2:
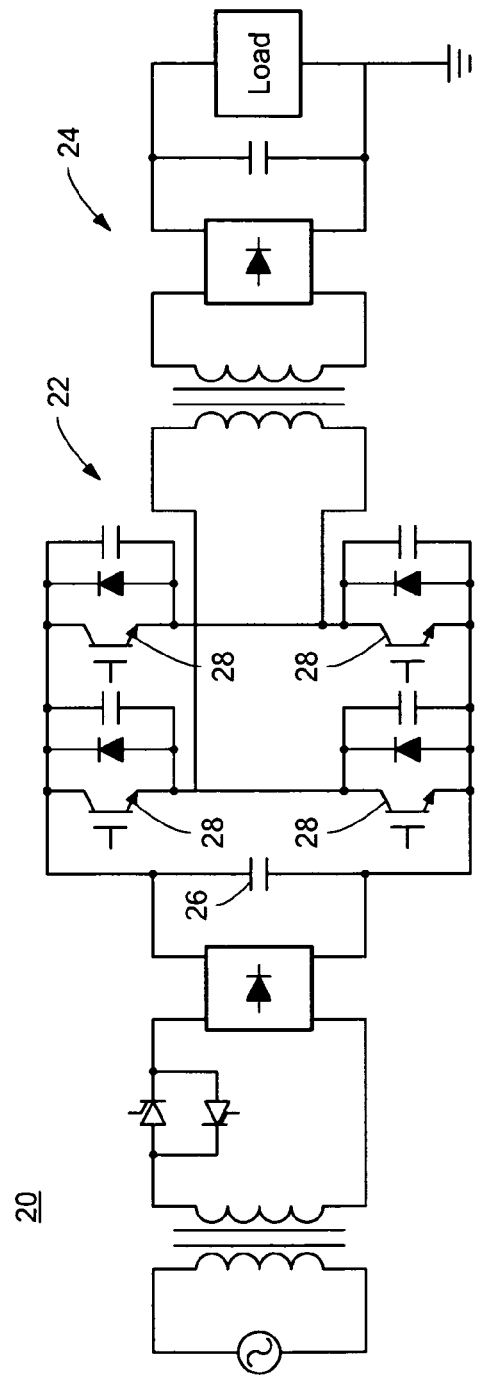
FIG. 2 is a simplified circuit diagram of a conventional power converter modulator in service at SNS allegedly used to reduce capacitor droop.

Another conventional high-power system used to allegedly regulate droop without dissipation is power converter module 20, FIG. 2 in service at SNS. Power converter module 20 includes semiconductor-switch bridge circuit 22 that produces pulses of alternate voltage. The pulses are stepped up by transformer 24, then rectified to deliver the output pulse to provide a flat output pulse as a voltage on bus capacitor 26 droops.

However, a problem with the SNS power converter 20 is that bridge circuit 22 switches full power repeatedly during a pulse and therefore requires large switching transistors 28. Moreover, the droop-correction of the system is not yet functional.

Figure 3:
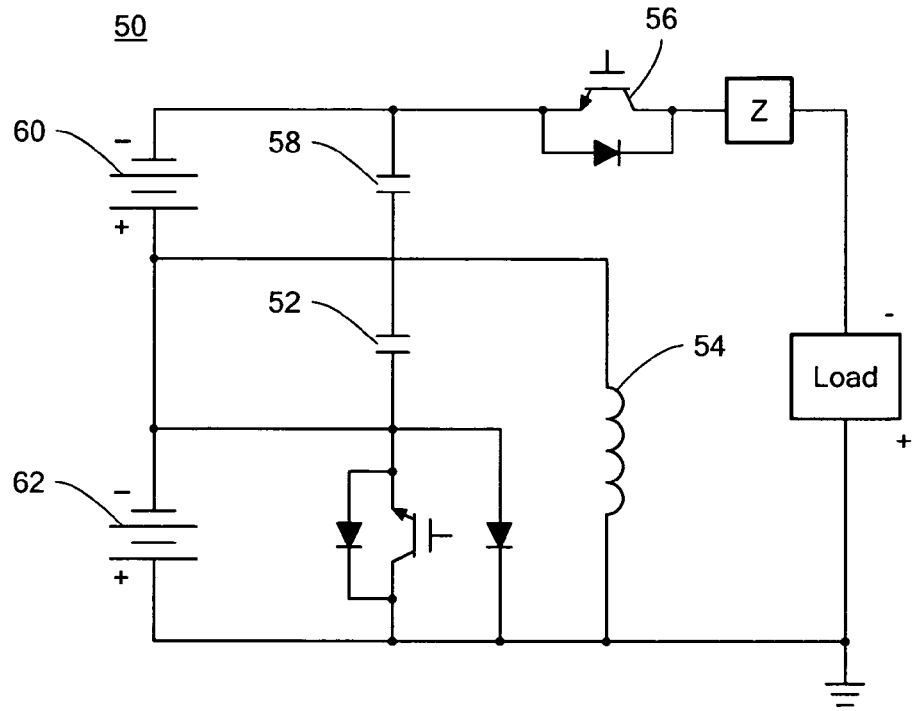
FIG. 3 is a simplified circuit diagram of a conventional bouncer modulator used to reduce capacitor droop.

Another conventional system to regulate droop in long-pulsed modulators is bouncer modulator 50, FIG. 3. Bouncer modulator 50 compensates for droop with bouncer capacitor 52 and inductor 54. Modulator 50 operates by first switching bouncer capacitor 52 through inductor 54, and the voltage on capacitor 52 operates as a cosine. As a voltage across capacitor 52 decreases, the voltage changes nearly linearly with time. Switch 56 is synchronized with the voltage drop so that the changing voltage on bouncer capacitor 52 compensates for the droop on main capacitor 58.

However, both main power supply 60 and bouncer power supply 62 need to be well regulated to provide an accurate output voltage and therefore need to be switching power supplies which can be controlled so that they do not produce flicker. A high-power switching supply 60 is significantly more expensive than an SCR-controlled power supply.

Figure 4:
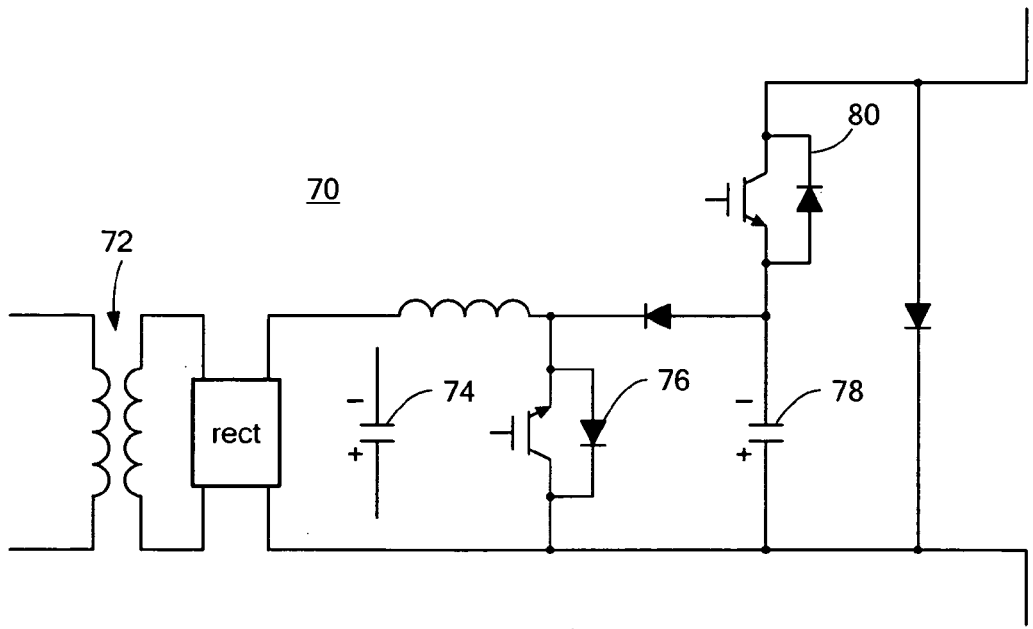
FIG. 4 is a simplified circuit diagram of a single stage of a pulse-step modulator used to reduce capacitor droop.

Another conventional system to regulate droop and long-pulsed modulators is a pulse step modulator 70, FIG. 4, of which, in this example, a single stage is shown. A pulse step modulator operates with multiple stages that are charged in parallel, then switched in series. Transformer 72 charges input capacitor 74 through a rectifier bridge. Input capacitor 74 feeds boost regulator 76 which charges output capacitor 78. Boost regulator 76 is controlled to provide a constant power draw and reduces flicker. Output capacitor 78 is switched into the load using insulated gate bipolar transistor (IGBT) 80.

However, one problem with conventional pulsed-step modulator 70 is that all the power passes through boost regulator 76 which is configured as a switching supply. Pulsed step modulator also has a large size due to the high-voltage charging transformer 72. Such a design is more expensive than SCR-controlled power supplies.

Figure 5:
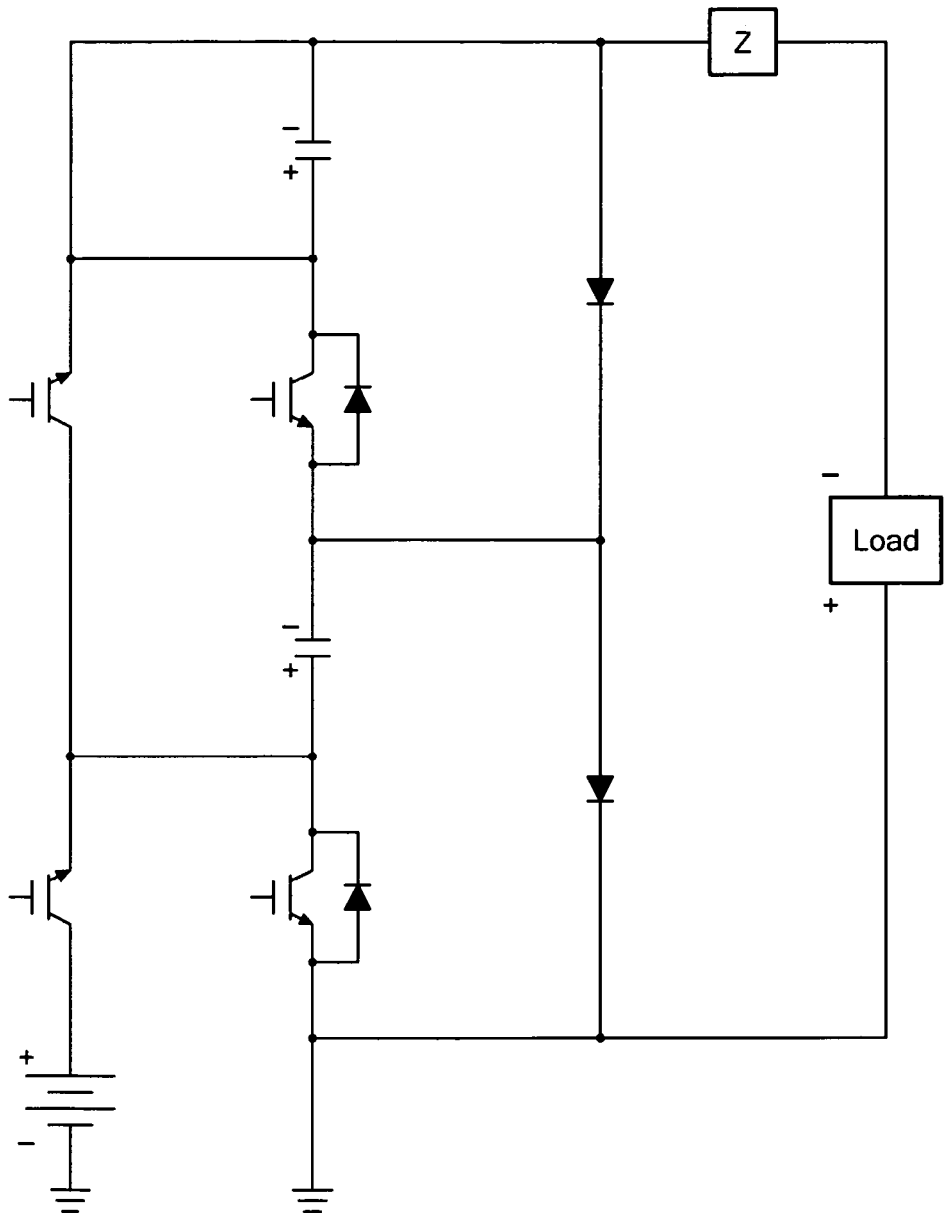
FIG. 5 is a simplified circuit diagram of two stages of a conventional Marx generator used to reduce capacitor droop in a long-pulsed modulator.

Another conventional system to regulate droop in long-pulsed modulators is Marx generator 90, FIG. 5. Marx generator 90 is similar to pulsed step modulator 70, as discussed in the Background section above. One problem with Marx generator 90 is that to eliminate flicker the system requires a switching supply, which is expensive.

Figure 6:
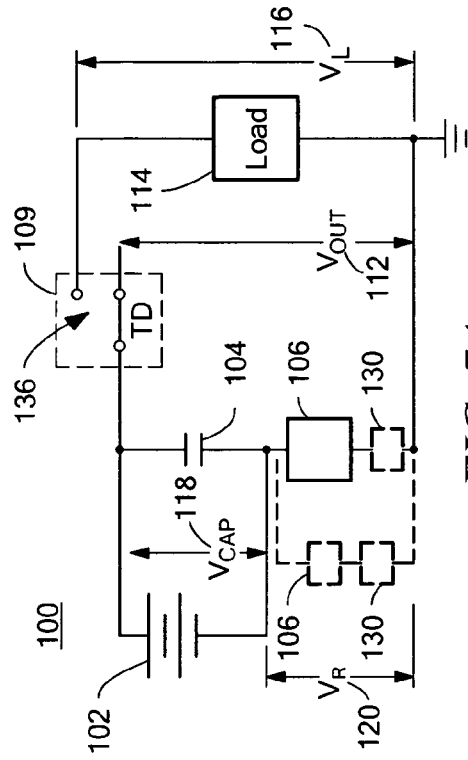
FIG. 6 is a schematic block diagram showing the primary components of one embodiment of the system for regulating the output of a high-voltage, high-power, DC supply of this invention.

There is shown in FIG. 6 one embodiment of system 100 for regulating the output of a high-voltage, high-power DC supply. System 100 includes high-voltage DC power supply 102 and storage capacitor 104. System 100 also includes at least one non-dissipative regulator, e.g., regulator 106. The at least one non-dissipative regulator may include a plurality of regulators, as discussed in further detail below. As defined herein, non-dissipative means dissipation is not inherently required for regulator 106 to operate. The switches and other components in regulator 106 may dissipate a small amount of power. Regulator 106 preferably has an output voltage range less than the output voltage range of high-voltage DC power supply 102. Regulator 106 includes internal storage, capacitance, and control circuit configured to maintain a desired high voltage output at a desired high voltage, $V_{OUT}$-112, on load 114, as discussed in further detail below.

Figure 7A:
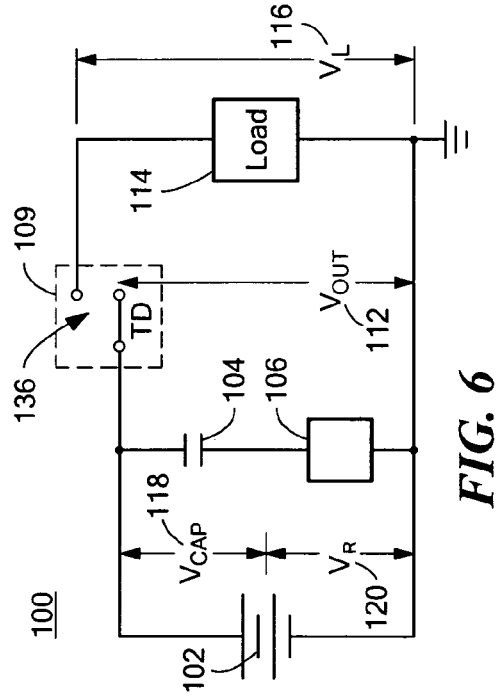
FIG. 7A is a schematic block diagram of another embodiment of the system for regulating the output of a high-voltage, high-power, DC supply of this invention.
Figure 7B:
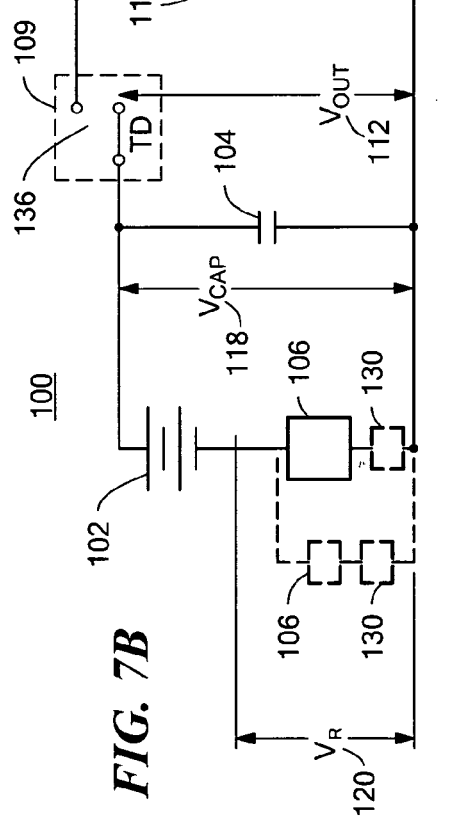
FIG. 7B is a schematic block diagram of another embodiment of the system for regulating the output of a high-voltage, high-power, DC supply of this invention.

The inventors hereof realized that regulator 106 only needs enough authority to deal with the droop on capacitor 104. For example, if the droop of storage capacitor 104 is 10%, regulator 106 needs only a 10% range, rather than operating with the full voltage capability provided by high-voltage DC power supply 102. This minimizes the cost and losses of regulator 106. In one example, as shown in FIG. 6, storage capacitor 104 and regulator 106 are connected in series and the series combination is connected in parallel with high-voltage DC power supply 102. In another example, as shown in FIG. 7A, high-voltage DC power supply 102 and storage capacitor 104 are connected in parallel, and regulator 106 is connected in series with the parallel combination. In yet another example, as shown in FIG. 7B, DC power supply 102 and regulator 106 are connected in series, and the series combination is connected in parallel with storage capacitor 104. System 100, FIGS. 6-7B, may also include modulator 109 including at least one switching device 136, e.g., at least one IGBT or similar type device. In either case, as capacitor 104, FIGS. 6-7B, discharges during pulsing, the output load voltage, $V_L$-116 would droop without regulator 106. Regulator 106 is configured to cancel this droop and produces a flat output voltage, $V_{OUT}$-112.

In one example, the variation in the output load voltage is cancelled by measuring the actual load voltage, $V_L$-116, comparing the actual load voltage to the desired high-voltage, and adjusting the actual load voltage to the desired output by adjusting regulator voltage, $V_R$-120, such that the sum of the regulator voltage, $V_R$-120, plus the storage capacitor voltage, $V_C$-118, equals the desired output voltage.

Regulator 106 effectively gives system 100 an infinite capacitance because the output voltage does not vary during the pulse or charging. One preferred location of regulator 106 is in series with the capacitor, as shown in FIG. 6. This provides a flat voltage to high-voltage DC power supply 102 as well as to load 114. As a result, high-voltage DC power supply 102 can operate at constant power as the modulator is pulsing, eliminating flicker. Such a design also allows high-voltage DC power supply 102 to be SCR-controlled, which reduces cost when compared to a conventional switching supply. The result is system 100 efficiently regulates the output of high-voltage, high-power DC supply 102 and significantly reduces droop.

Figure 8A:
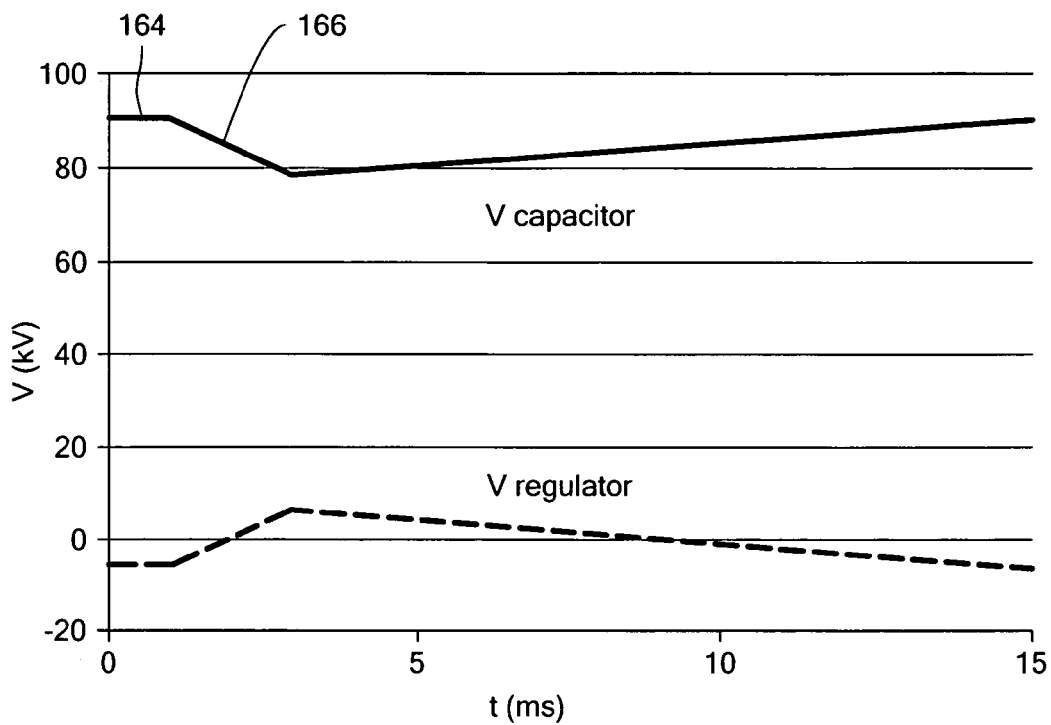
FIGS. 8A and 8B depict examples of output waveforms of one exemplary operation of the system shown in FIG. 6.
Figure 8B:
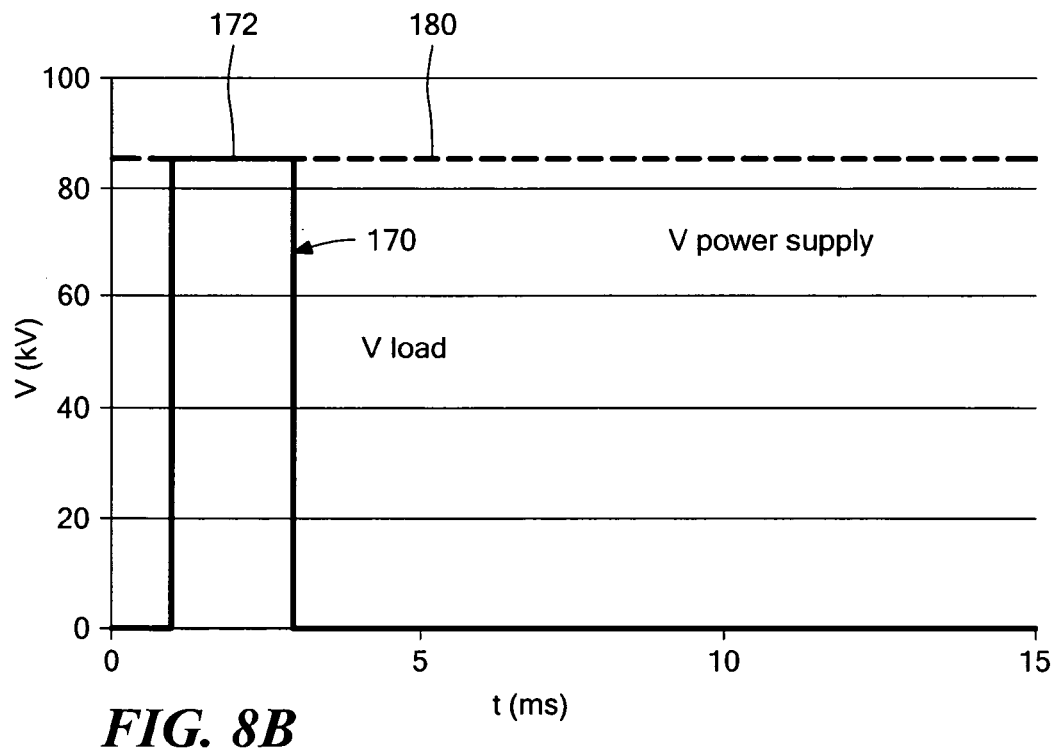

One example of the output waveforms of system 100, FIG. 6 is discussed below with reference to FIG. 8A and 8B. In this example, capacitor 104 is initially charged to a voltage higher than desired output voltage, as shown by trace 164, FIG. 8A. Switch 136, FIG. 6. is closed at the beginning of the pulse, and regulator 106 initially switches power into its internal storage capacitance, producing a voltage that opposes the voltage on capacitor 104. The voltage on capacitor 104 droops, as shown at 166, FIG. 8A, as energy is delivered to load 114. As the voltage droops below the level of trace 172, FIG. 8B, regulator 106, FIG. 6, reverses power flow, switching power out of its internal storage capacitance, producing a voltage that adds to the voltage on capacitor 104. The net output voltage across load 114 is constant, as shown in trace 170. Preferably, the high switching speed of regulator 106 allows this process to precisely regulate the output voltage throughout the pulse. The voltage of high-voltage DC power supply 102 is constant, as shown by trace 180, FIG. 8B. Between pulses, storage capacitor 104, FIG. 6 is recharged and regulator 106 operates in reverse. Regulator 106 initially adds, then subtracts voltage on storage capacitor 104 allowing high-voltage DC power supply 102 to operate at a nearly constant power level, e.g., as shown by trace 180, FIG. 8B. In one example, the output voltage variation of system 100, FIGS. 6-7B, is much less than 1%. Regulator 106 also allows for line voltage variations that are faster than can be handled by DC power supply 102. In one example, voltage regulator 106 needs to handle only about ±7.5% of the voltage. The only net power required is to replace the losses in the regulator. Preferably, regulator 106 is very compact and less expensive compared to a typical 7 MW conventional inverter that would be required.

Figure 9A:
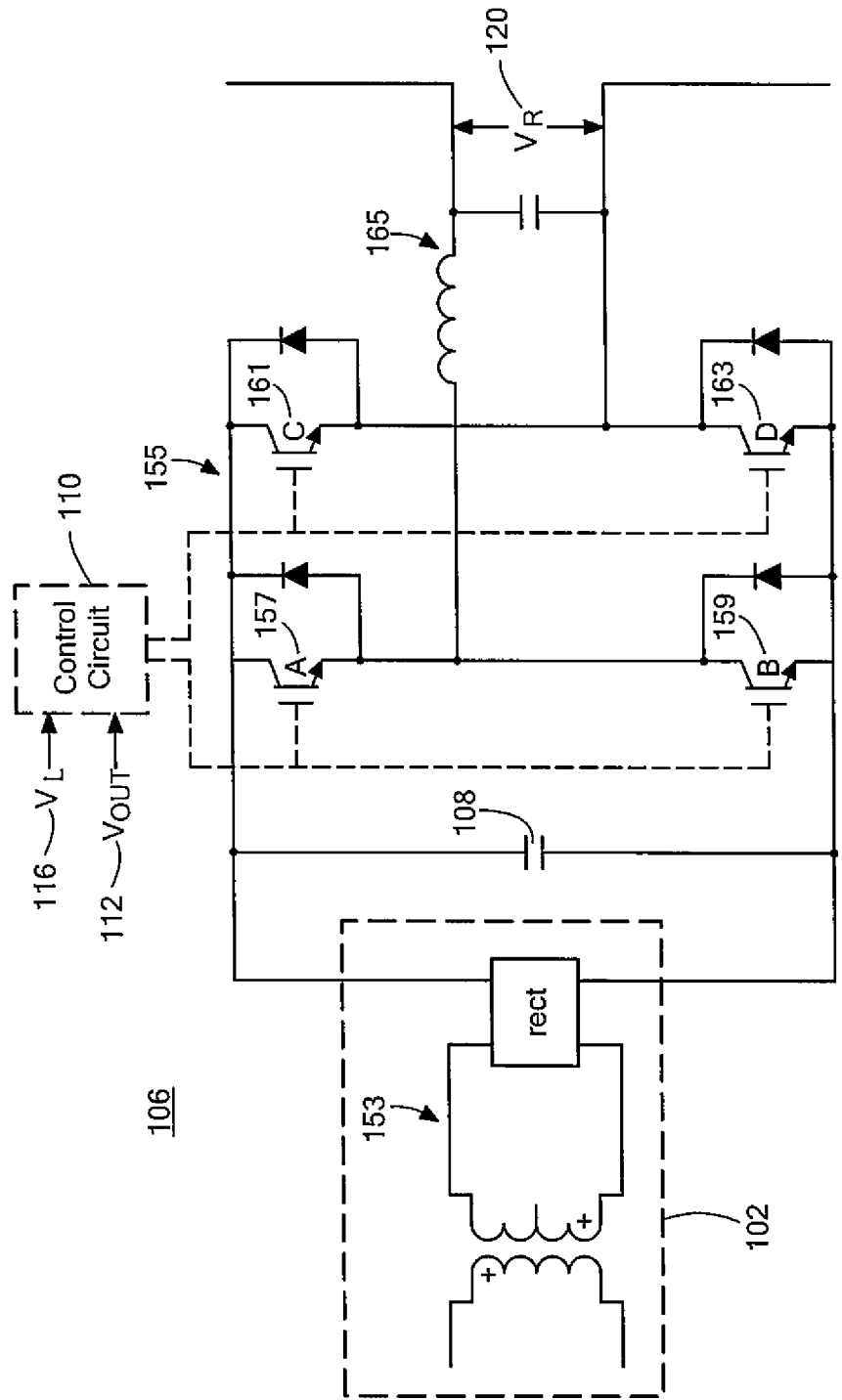
FIG. 9A is a circuit diagram showing in further detail one example of the primary components of the regulator shown in one or more of FIGS. 6-7B configured as a full-bridge regulator.

Regulator 106, FIGS. 6-7B, is preferably based on a bridge circuit. One implementation configured as a full-bridge single stage regulator 106 is shown in FIG. 9A. Rectifier bridge circuit 155 preferably includes a full bridge of switching transistors, e.g., switching transistors A-157, B-159, C-161, and D-163 as shown that produce the output. Rectifier bridge circuit 155 includes internal storage, e.g., a capacitance, such as capacitor 108, preferably charged by transformer 153, and control circuit 110 configured to maintain a desired high voltage output at a desired high voltage, $V_{OUT}$-112, FIGS. 6-7B, on load 114. Preferably, output filter 165, FIG. 9A, removes the transient voltages.

Figure 10:
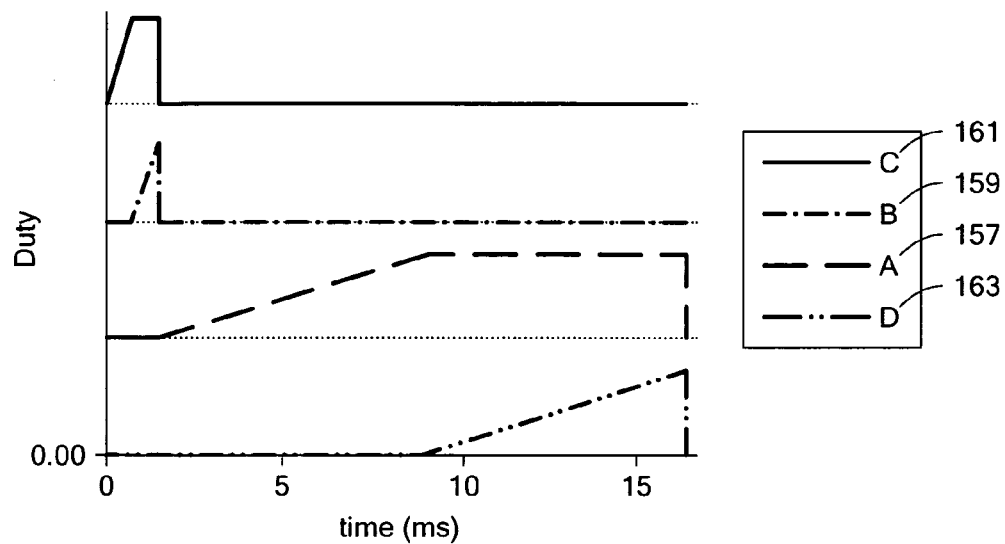
FIG. 10 depicts an example of a switching duty cycle for the bridge circuit shown in FIG. 9A.

Bridge circuit 155 preferably operates in four different modes. For example, during pulsing, bridge circuit 155 subtracts, and then adds voltage to the output. During charging, bridge circuit 155 adds, and then subtracts voltage to the output. There are at least two ways bridge circuit 155 can be switched. One switching duty cycle is shown in FIG. 10. In this example, one switch, e.g., switch C-161, FIG. 9A, operates during the first half of the pulse. The duty factor of this switch steadily increases while the other switches are closed. At the midpoint of the pulse this switch is closed, and it remains closed for the rest of the pulse. The diagonally-opposite switch, e.g., switch B-159, then begins to operate with its duty steadily increasing. Switches B-159, C-161 are then opened at the end of the pulse. During charging, the duty cycle is similar except that different switches operate; in this example, switches A-157 and D-163. The duty cycle for this exemplary operation is shown in FIG. 10.

Figure 11:
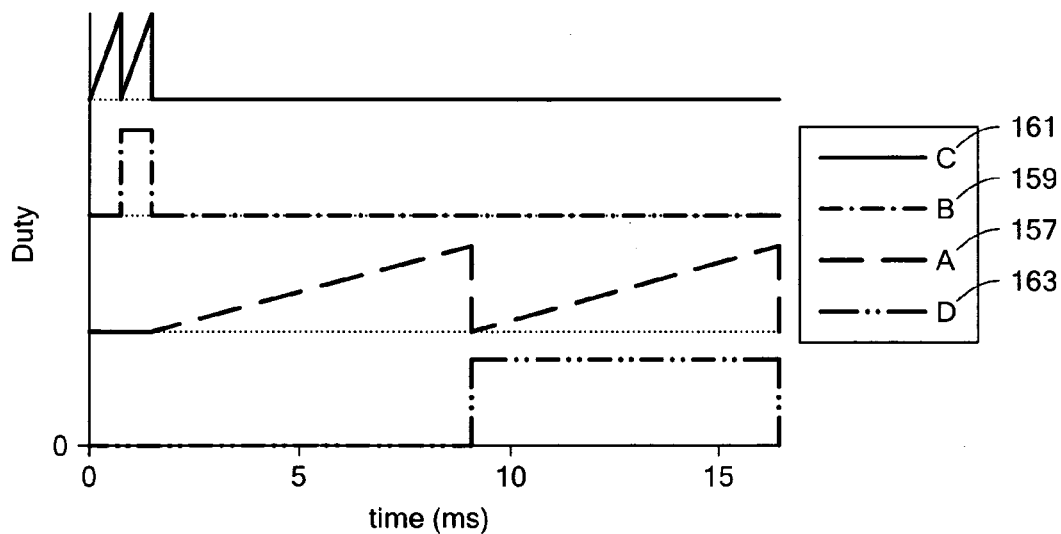
FIG. 11 depicts another example of a switching duty cycle for switching the bridge circuit shown in FIG. 9A.

An alternate switching duty cycle to regulate the output voltage of system 100, shown in one or more of FIGS. 6-7B, is shown in FIG. 11. The duty cycle in the first half of the pulse is the same as discussed above with reference to FIG. 10. However, in this example, the duty during the second half of the pulse changes: the diagonally-opposite switch closes, in this example, switch B-159, and the switch C-161 duty goes to zero, then increases, as shown in FIG. 11. As in the previous example, the switching duty during charging is similar to the duty during pulsing.

The above descriptions are for the case when the transitions between switching modes occur at the midpoint of the pulse, when the voltage on the main capacitor has drooped to half its maximum. This minimizes the bus capacitance needed. However, the mode transition can be made at any time, as long the mode transitions during the pulse and charge occur at the same capacitor droop voltage.

Figure 9B:
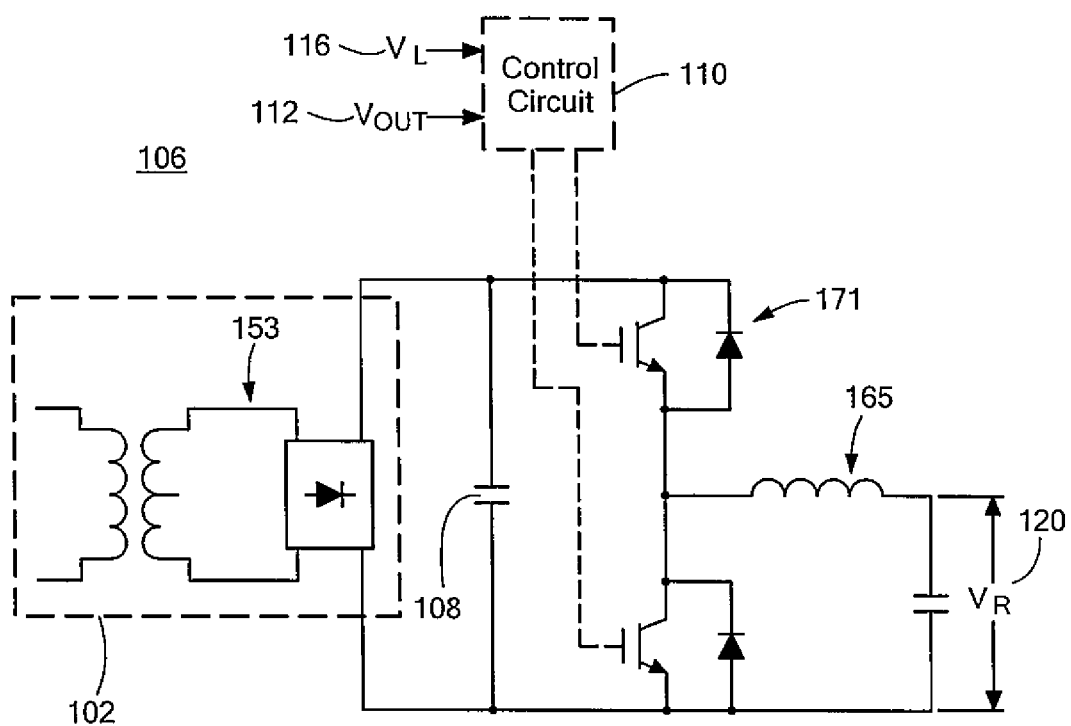
FIG. 9B is a circuit diagram showing in further detail one example of the primary components of the regulator shown in one or more of FIGS. 6-7B configured as a half-bridge regulator.
Figure 9C:
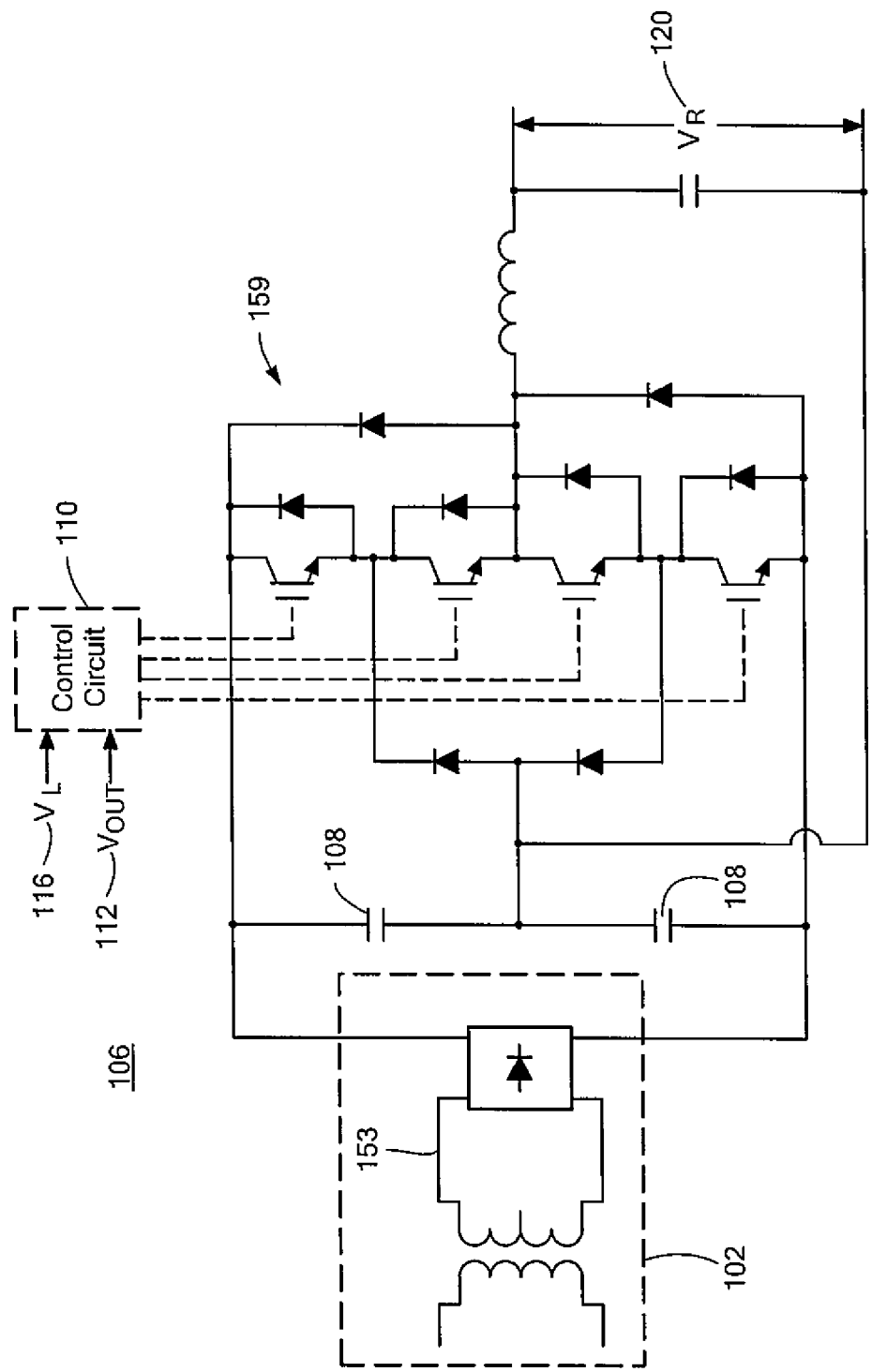
FIG. 9C is a circuit diagram showing in further detail one example of the primary components of the regulator shown in one or more of FIGS. 6-7B configured as a four-switch half-bridge regulator.

Regulator 106, FIGS. 6-7B may be configured as a half bridge circuit 157, FIG. 9B, or as a four-switch half bridge circuit 159, FIG. 9C. Half bridge circuit 157, FIG. 9B, and four-switch half bridge circuit 159, FIG. 9C, also preferably include internal storage, e.g., capacitor 108, and control circuit 110 configured to maintain a desired high-voltage output at a desired high-voltage, $V_{OUT}$-112, FIGS. 6-7B, on load 114. Preferably, the transistors in half bridge circuit 157, FIG. 9B, four-switch half bridge circuit 159, FIG. 9C, and rectifier bridge circuit 155, FIG. 9A, are insulated gate bipolar transistors (IGBTs), e.g., as shown in FIGS. 9A-9C. In other designs, the transistors used for rectifier bridge circuit 155, half bridge circuit 157, or four-switch half bridge circuit 159 may be field effect transistors (FETs), bipolar junction transistors (BJTs), or similar type devices.

Figure 12:
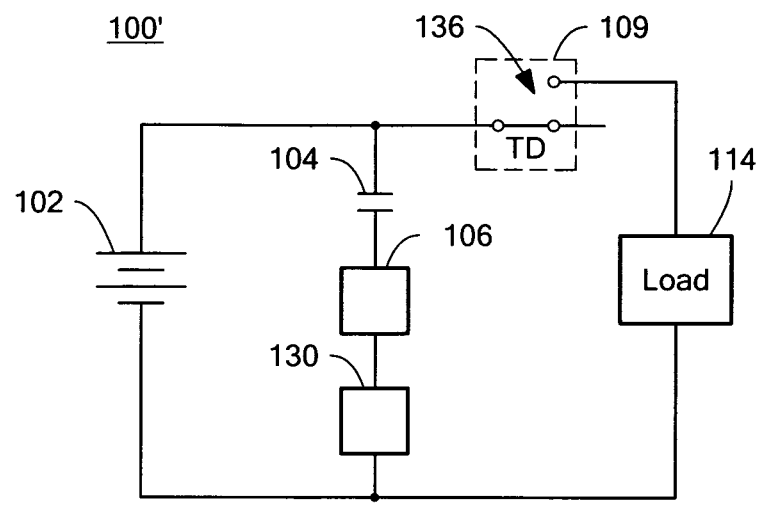
FIG. 12 is a schematic block diagram of another embodiment of the system for regulating the output of a high-voltage, high-power, DC supply of this invention including a plurality of regulators.
Figure 13:
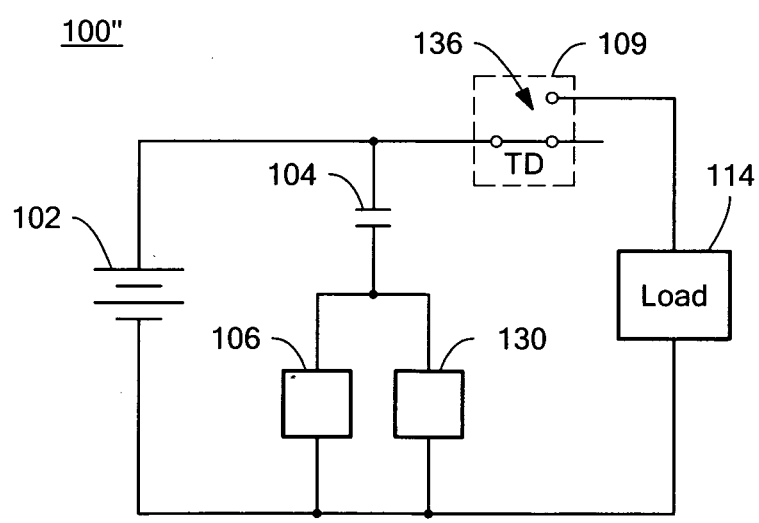
FIG. 13 is a schematic block diagram of another embodiment of the system for regulating the output of a high-voltage, high-power, DC supply of this invention including a plurality of regulators.

System 100', FIG. 12, for regulating the output of a high-voltage, high-power, DC supply 102 where like parts include like numbers, preferably includes a plurality of regulators, e.g., regulators 106, 130, connected in series with capacitor 104 as shown, or a plurality of a series of regulators as shown in FIG. 7A, to provide greater voltage regulation capability to system 100. In another example, system 100", FIG. 13, includes a plurality of regulators, e.g., regulators 106, 130, connected in parallel with respect to each other and in series with capacitor 104 as shown to provide greater current capability to system 100. The plurality of regulators, or the plurality of a series of regulators, may also be connected in series with the parallel combination of high-voltage power supply 102, FIG. 7A, and storage capacitor 104, e.g., as shown by regulators 106 and 130 (shown in phantom). The plurality of regulators, or the plurality of a series of regulators, may also be connected in series or in parallel with high-voltage power supply 102, FIG. 7B, e.g., regulators 106 and 130 (shown in phantom).

Figure 14:
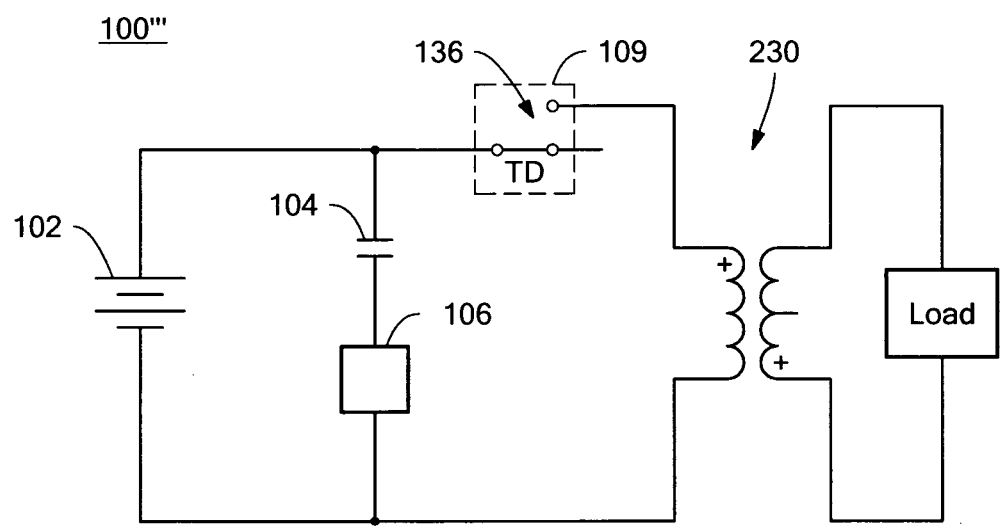
FIG. 14 is a simplified circuit diagram of the system shown in FIG. 6 including an output pulsed transformer.

System 100''', FIG. 14, for regulating the output of a high-voltage, high-power DC supply 102, may include transformer 230 as shown.

Figure 15:
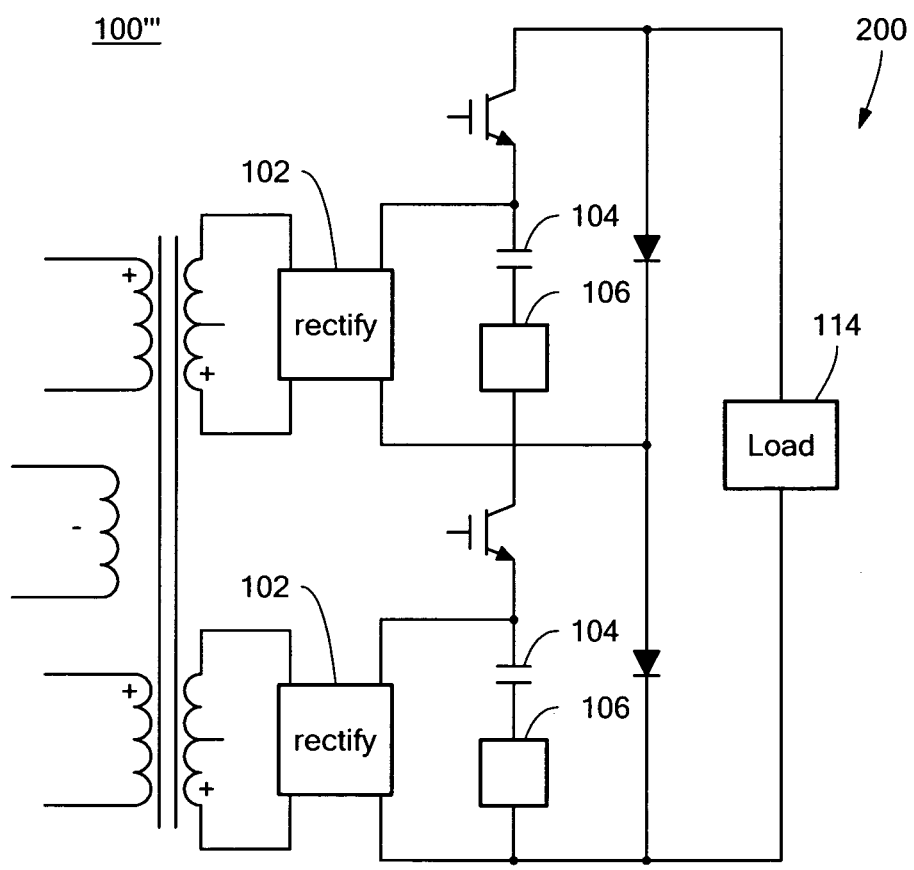
FIG. 15 is a circuit diagram of one example of the high-voltage DC power supply, the storage capacitor and the regulator shown in one or more of FIGS. 6-13, integrated with a two-stage pulse-step modulator.
Figure 16:
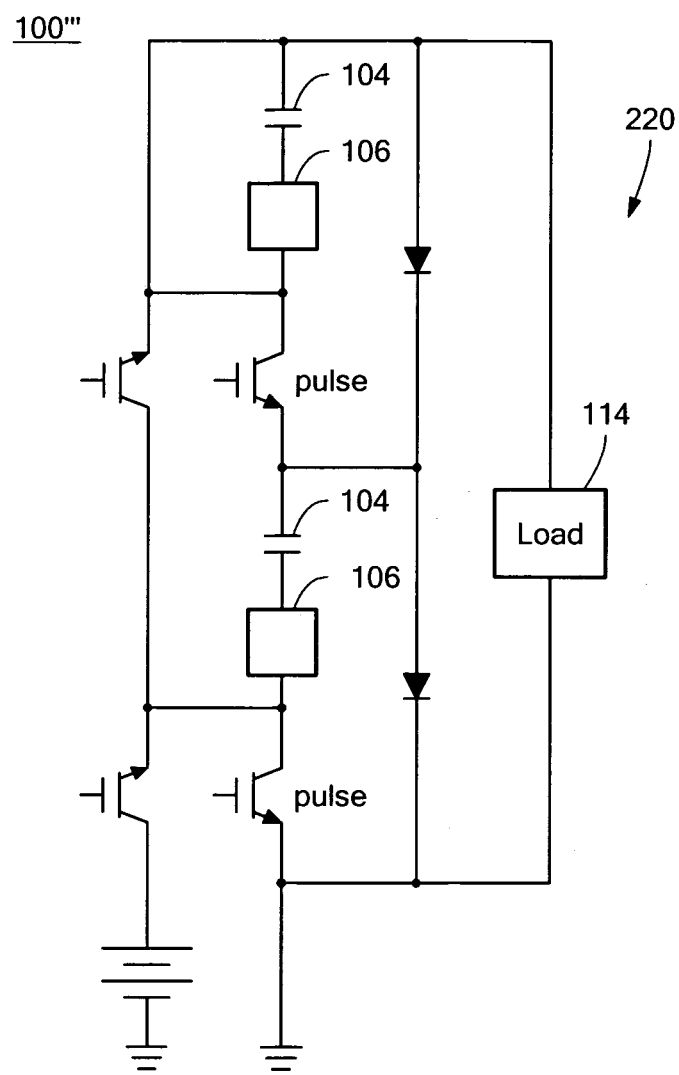
FIG. 16 is a circuit diagram of one example of the high-voltage DC power supply, the storage capacitor, and the regulator shown in one or more of FIGS. 6-13, integrated with a two-stage Marx generator.

In one example, a plurality of storage capacitors 104 and a plurality of regulators 106, may be integrated with pulse-step modulator 200, FIG. 15, or a Marx modulator 220, FIG. 16.

As discussed in the Background Section above, accelerators designed to operate continuously may have a large amount of ripple because the high-voltage power supply is SCR-controlled. Although a switching supply would produce much less ripple, it would be much more expensive.

Conventional approaches to mitigate the ripple from the power supply may rely on a modulating-anode supply, which reduces the ripple voltage between the cathode and the modulating anode, and low-level RF feedback that compensates for the remaining ripple. Although this method is somewhat effective, it may be necessary in some instances to reduce the ripple even further.

Figure 17:
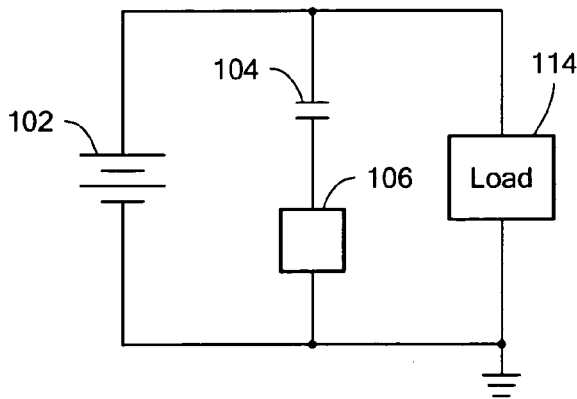
FIG. 17 is a schematic block diagram of another embodiment of the system for regulating the output of a high-voltage, high-power, DC supply configured to reduce DC ripple.
Figure 18:
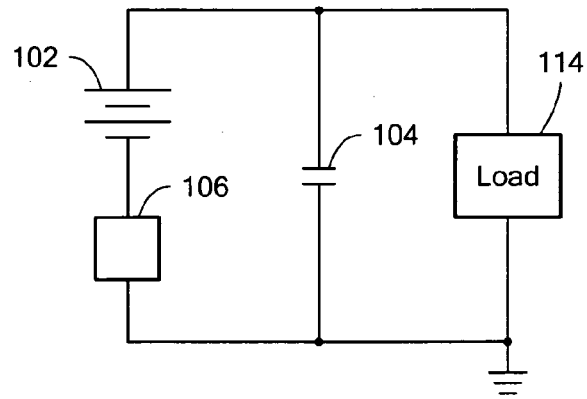
FIG. 18 is a schematic block diagram of another embodiment of the system for regulating the output of a high-voltage, high-power, DC supply configured to reduce DC ripple.
Figure 19:
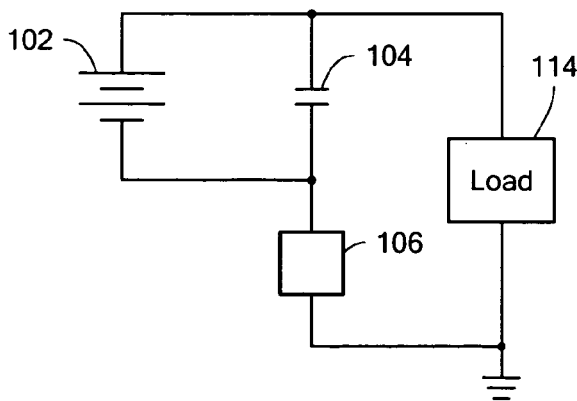
FIG. 19 is a schematic block diagram of another embodiment of the system for regulating the output of a high-voltage, high-power, DC supply configured to reduce DC ripple.

System 300, FIGS. 17-19, for regulating the output of a high-voltage, high-power DC supply includes high-voltage DC power supply 102, storage capacitor 104 and load 114. System 300 also includes at least one regulator 106, having the same structure as discussed above with reference to one or more of FIGS. 6-13, coupled in series with any of high-voltage DC power supply 102, storage capacitor 104 and load 114 to efficiently reduce DC ripple. Regulator 106 may be coupled in series with capacitor 104 as shown in FIG. 17, in series with high-voltage DC power supply 102 as shown in FIG. 18, or in series with the parallel combination of high-voltage DC power supply 102 and capacitor 104 as shown in FIG. 19. The location of regulator 106 in continuous system 300 does not make any difference to the over-all electrical properties (unlike pulsed system 100 discussed above with reference to one or more of FIGS. 6-13) because load 114 is constant and there is no flicker or droop.

In this example, regulator 106, FIGS. 17-19 is preferably configured to reduce DC ripple created by high-voltage DC power supply 102 by generating a cancellation voltage which approximately matches any ripple created by high-voltage DC power supply 102

In one example, bridge circuit 155, FIG. 9, generates the cancellation voltage which approximately matches any ripple on the high DC voltage created by DC power supply 102.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

What is claimed is:

1. A system for regulating the output of a high-voltage, high-power DC supply, the system comprising:
   a high-voltage DC power supply;
   a storage capacitor coupled to the high voltage DC supply; and
   at least one non-dissipative regulator coupled to the high voltage DC supply and the storage capacitor and having an output voltage range less than an output voltage range of the high-voltage DC power supply, the regulator including an internal storage and a control circuit configured to maintain a desired high-voltage output on a load by measuring an actual load voltage, comparing the actual load voltage to the desired high-voltage output, and adjusting the actual load voltage to the desired high-voltage output by adjusting a voltage of the non-dissipative regulator such that the sum of the voltage of the non-dissipative regulator plus a voltage on the storage capacitor equals the desired high-voltage.

2. The system of claim 1 in which the storage capacitor and the at least one non-dissipative regulator are connected in series.

3. The system of claim 2 in which the high-voltage DC power supply is connected in parallel with the series combination of the storage capacitor and the at least one non-dissipative regulator.

4. The system of claim 3 further including a pulse modulator comprising at least one switching device.

5. The system of claim 1 in which the high-voltage power supply and the storage capacitor are connected in parallel.

6. The system of claim 5 in which the at least one non-dissipative regulator is connected in series with the parallel combination of storage capacitor and high voltage power supply.

7. The system of claim 6 further including a modulator comprising at least one switching device.

8. The system of claim 1 in which the at least one non-dissipative regulator is connected in series with the high-voltage power supply.

9. The system of claim 8 in which the series combination of the power supply and at least one regulator is connected in parallel with the storage capacitor.

10. The system of claim 9 further including a modulator comprising at least one switching device.

11. The system of claim 1 further including a modulator comprising at least one switching device.

12. The system of claim 11 in which the regulator is configured to cancel variations in the high-voltage output to provide a flat high-voltage.

13. The system of claim 1 in which the control circuit is configured to maintain the desired high-voltage on the load by measuring load voltage and adjusting the regulator voltage such that the sum of the regulator voltage and the storage capacitor voltage equals the desired high-voltage.

14. The system of claim 1 in which the at least one regulator includes a plurality of regulators connected in series to provide a greater voltage adjustment range.

15. The system of claim 14 further including a modulator comprising at least one switching device.

16. The system of claim 1 in which the at least one regulator includes a plurality of regulators are connected in parallel with respect to each other and the parallel combination is connected in series to provide greater current capacity.

17. The system of claim 16 further including a modulator comprising at least one switching device.

18. The system of claim 1 in which the regulator includes at least one stage.

19. The system of claim 18 in which the regulator includes a bridge circuit comprised of one or more of switching transistors.

20. The system of claim 19 in which the bridge circuit includes a full bridge circuit.

21. The system of claim 19 in which the bridge circuit includes a half bridge circuit.

22. The system of claim 19 in which the bridge circuit includes a four-switch half bridge circuit.

23. The system of claim 1 in which the high-voltage DC power supply, the storage capacitor, and the regulator are integrated with a multi-stage pulse step modulator.

24. The system of claim 1 in which the high-voltage DC power supply, the storage capacitor, and the regulator are integrated with a Marx generator.

25. The system of claim 1 further including an output pulsed transformer.

26. The system of claim 1 in which the high-voltage DC power supply is configured to be SCR-controlled.

27. The system of claim 1 in which the high-voltage DC power supply includes a switching supply.

28. The system of claim 1 in which the high-voltage DC power supply includes a transformer-rectifier.

29. The system of claim 1 in which the regulator is configured to reduce DC ripple by generating a cancellation voltage that approximately matches any DC ripple created by the high-voltage DC power supply.

30. The system of claim 1 in which the regulator is pulse-frequency modulated.

31. The system of claim 1 in which the regulator is pulse-width modulated.

32. The system of claim 1 in which the regulator is boundary-controlled.

33. The system of claim 1 further including one or more LC filters configured to remove transient voltages.

34. A system for regulating the output of a high-voltage, high-power DC supply, the system comprising:
a pulse modulator;
a high-voltage DC power supply;
a storage capacitor coupled to the high voltage DC power supply; and
at least one non-dissipative regulator coupled to the high voltage power supply and the storage capacitor and having an output voltage range less than an output voltage range of the high-voltage DC power supply, the regulator including an internal storage and a control circuit configured to maintain a desired high-voltage output on a load by measuring an actual load voltage, comparing the actual load voltage to the desired high-voltage output, and adjusting the actual load voltage to the desired high-voltage output by adjusting a voltage of the non-dissipative regulator such that the sum of the voltage of the non-dissipative regulator plus a voltage on the storage capacitor equals the desired high-voltage.

* * * * *